(12) United States Patent
Yamaguchi et al.

(10) Patent No.: US 7,196,212 B2
(45) Date of Patent: Mar. 27, 2007

(54) PERFLUOROPOLYETHER-MODIFIED SILANE, SURFACE TREATING AGENT, AND ANTIREFLECTION FILTER

(75) Inventors: Koichi Yamaguchi, Gunma-ken (JP); Hirofumi Kishita, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 930 days.

(21) Appl. No.: 10/263,781

(22) Filed: Oct. 4, 2002

(65) Prior Publication Data

US 2003/0139620 A1 Jul. 24, 2003

(30) Foreign Application Priority Data

Oct. 5, 2001 (JP) .............................. 2001-310247
Dec. 12, 2001 (JP) .............................. 2001-378382

(51) Int. Cl.
  *C07F 7/04* (2006.01)
  *C07F 7/12* (2006.01)
(52) U.S. Cl. ..................................... 556/463; 556/488
(58) Field of Classification Search ................ 556/463, 556/488
See application file for complete search history.

(56) References Cited

U.S. PATENT DOCUMENTS 4,687,707 A 8/1987 Matsuo et al.
6,958,191 B2 * 10/2005 Yamaguchi et al. ......... 428/447

FOREIGN PATENT DOCUMENTS

| EP | 0 797 111 A2 | 9/1997 |
|---|---|---|
| EP | 1055718 A1 | 11/2000 |
| JP | 48-26822 A | 4/1973 |
| JP | 52-112698 A | 9/1977 |
| JP | 53-111336 A | 9/1978 |
| JP | 58-167597 A | 3/1983 |
| JP | 58046301 A | 3/1983 |
| JP | 58050401 A | 3/1983 |
| JP | 58-122979 A | 7/1983 |
| JP | 59049501 A | 3/1984 |
| JP | 62-148902 A | 2/1987 |
| JP | 01294709 A | 11/1989 |
| JP | 9-258003 A | 3/1997 |
| JP | 10120443 | 5/1998 |
| JP | 10120444 | 5/1998 |
| JP | 10120445 | 5/1998 |
| JP | 10148701 | 6/1998 |
| JP | 11029585 A | 2/1999 |
| JP | 2001-188102 A | 10/2001 |
| WO | WO 02/30848 A1 | 4/2002 |

\* cited by examiner

*Primary Examiner*—Samuel A Barts
*Assistant Examiner*—Lalitha Nagubandi
(74) *Attorney, Agent, or Firm*—Birch, Stewart, Kolasch & Birch, LLP

(57) ABSTRACT

Novel perfluoropolyether-modified silanes are improved in water/oil repellency, parting properties, chemical resistance, lubricity, durability, antifouling properties and fingerprint wipe-off. An antireflection filter is also provided comprising an inorganic antireflection layer including a surface layer in the form of a silicon dioxide-base inorganic layer, and an antifouling layer, preferably of the perfluoropolyether-modified silane, on the surface layer. The antifouling layer has a sliding angle of oleic acid of up to 5°, a change of the sliding angle after solvent washing relative to the sliding angle before solvent washing being up to 10%.

4 Claims, 1 Drawing Sheet

PERFLUOROPOLYETHER-MODIFIED SILANE, SURFACE TREATING AGENT, AND ANTIREFLECTION FILTER

This invention relates to novel perfluoropolyether-modified silanes having improved properties including water and oil repellency, parting properties, chemical resistance, lubricity, durability, antifouling properties and fingerprint wipe-off; surface treating agents comprising the same; and antireflection filters including an antifouling layer having improved antifouling properties, fingerprint wipe-off and durability.

BACKGROUND OF THE INVENTION

In general, perfluoropolyether-containing compounds have water and oil repellency, chemical resistance, lubricity, parting and antifouling properties because of their very low surface energy. For the effective utilization of such properties, these compounds are widely used in the industry as water/oil repellent antifouling agents for paper and fibers, lubricants in magnetic recording media, oil repellents in precision machines, parting agents, cosmetic ingredients, and protective coatings.

The same properties, however, suggest that perfluoropolyether-containing compounds are non-tacky and non-adherent to other substrates. They are applicable to the substrate surface, but difficult to form a coating firmly bonded to the substrate.

Silane coupling agents are well known as the means for establishing a firm bond between a substrate surface such as glass or fabric and an organic compound. The silane coupling agent has an organic functional radical and a reactive silyl radical (typically alkoxysilyl radical) in a molecule. The alkoxysilyl radical undergoes self-condensation reaction with air-borne moisture, converting to a siloxane to form a coating. At the same time, the silane coupling agent forms chemical and physical bonds with the surface of glass or metal, resulting in a durable tough coating. By virtue of these advantages, the silane coupling agent is widely used as a coating agent to a variety of substrates.

As one exemplary compound which exhibits the above-mentioned characteristics, JP-A 58-167597 discloses fluoroaminosilane compounds of the following formula (2):

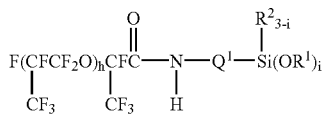

(2)

wherein $R^1$ and $R^2$ each are a $C_1$–$C_4$ alkyl radical, $Q^1$ is $CH_2CH_2CH_2$ or $CH_2CH_2NHCH_2CH_2CH_2$, h is an integer of 1 to 4, and i is 2 or 3. These compounds, however, fail to fully take advantage of the perfluoropolyether radical because the perfluoropolyether radical portion is as short as consisting of two to five monomer units of hexafluoropropylene oxide (HFPO).

Also, JP-A 58-122979 discloses compounds of the following formula (3) as a water and oil repellant to be applied to glass surface.

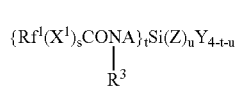

(3)

Herein, $Rf^1$ is a polyfluoroalkyl radical having 1 to 20 carbon atoms, which may contain at least one ether bond, $R^3$ is hydrogen or lower alkyl, A is alkylene, $X^1$ is —$CON(R^4)$-Q- or —$SO_2N(R^4)$-Q- wherein $R^4$ is lower alkyl and Q is a divalent organic radical, Z is lower alkyl, Y is halogen, alkoxy or $R^5COO$— wherein $R^5$ is hydrogen or lower alkyl, s is 0 or 1, t is 1, 2 or 3, and u is 0, 1 or 2. These compounds do not exert fully satisfactory effects because the number of carbon atoms in the fluorinated radical portion is as small as 1 to 20 carbon atoms.

Since many tall buildings are constructed in the recent decades, the demand for the technology for imparting "stain resistance" or "ease of stain removal" for keeping glazing maintenance-free is increasing. The same technology is also required in order that display screens be fingerprint-free for better outer appearance and visibility. There is a desire to have a material meeting such demands.

Effective utilization of the above-described characteristics of perfluoropolyether-containing compounds and silane coupling agents is desired. JP-A 9-258003 discloses a fluorinated silane compound of the formula (4) shown below as a surface treating agent which can form on the substrate surface a tough coating having excellent water and oil repellency, antifouling properties, chemical resistance, lubricity and parting properties. Specifically, the fluorinated silane compound of formula (4) forms an antifouling layer on a lens.

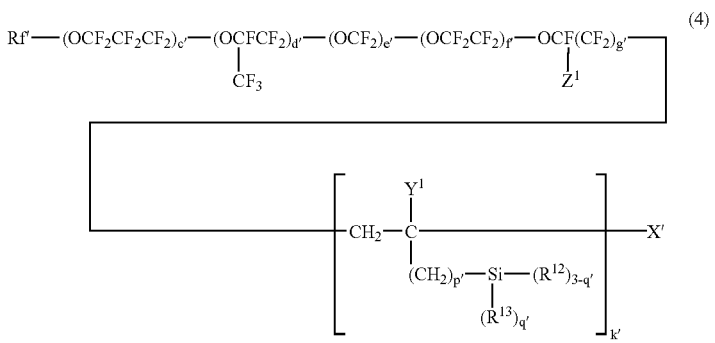

(4)

Herein, Rf' is a straight or branched perfluoroalkyl radical having 1 to 16 carbon atoms, X' is iodine or hydrogen, $Y^1$ is hydrogen or lower alkyl, $Z^1$ is fluorine or trifluoromethyl, $R^{12}$ is a hydrolyzable radical, $R^{13}$ is hydrogen or an inactive monovalent organic radical, c', d' and f' each are an integer of 0 to 200, g' is 0 or 1, p' and q' each are an integer of 0 to 2, and k' is an integer of 1 to 10.

However, the fluorinated silane compounds of formula (4) are insufficiently adhesive to substrates and unsatisfactorily durable because hydrolyzable radicals are contained in a relatively large proportion, but only at one end of a molecule. When they are used as the surface treating agent to lenses, they fail to maintain the desired performance for a long term and are thus below the practically acceptable level.

Antireflection films are generally provided on the surface of viewer equipment or the like. Such antireflection films tend to receive contaminants such as hand dirt, fingerprints, sweat, saliva, hair conditioners and the like. When antireflection films are contaminated, surface reflectivity changes, or deposits are seen as white spots in relief to make display contents vague. There is the drawback that contaminants on the antireflection film become more obstructingly perceivable than on a simple transparent plate (without antireflection film). It has long been desired to have an antireflection film which is effective for preventing contaminants from depositing thereon and easy to remove contaminants if deposited.

Several antireflection films intended to improve stain resistance are known in the prior art. JP-B 6-5324 discloses an antireflection film comprising an antireflection layer consisting of a single inorganic ply or plural inorganic plies having a surface layer formed mainly of silicon dioxide by PVD, and a cured layer on the surface thereof of an organic polysiloxane base polymer or perfluoroalkyl-bearing polymer.

However, when human contaminants such as hand dirt and fingerprints deposit on this antireflection film, it is difficult to wipe off the contaminants with tissue paper. The contaminants are extended and spread to a thin film when wiped, and the antireflection film can be marred on strong rubbing. Satisfactory removal of contaminants is accomplished by no means.

Perfluoropolyether radical-bearing compounds generally have characteristics as mentioned above and are thus utilized in the art. For example, JP-A 11-29585 discloses an antireflection film including an antifouling layer of a perfluoropolyether-modified aminosilane of the formula (5):

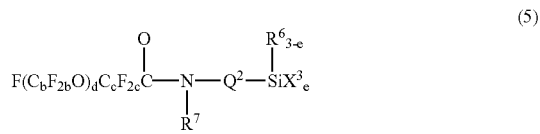

(5)

wherein $X^3$ is a hydrolyzable radical, $R^6$ is lower alkyl, $R^7$ is hydrogen or lower alkyl, $Q^2$ is $CH_2CH_2CH_2$ or $CH_2CH_2NHCH_2CH_2CH_2$, d is an integer of 6 to 50, e is 2 or 3, b and c each are an integer of 1 to 3. This antireflection film has improved water and oil repellency, antifouling, chemical resistance, lubricity and parting properties. However, it has the problems of time-consuming curing and poor adhesion to substrates because polar radicals having a high affinity to water such as amide radicals are contained in the molecule of perfluoropolyether-modified aminosilane used in the antifouling layer and the proportion (wt %) of hydrolyzable radicals per molecule is low. The silane compound must be given further functions before it can be utilized as the surface treating agent.

JP-A 2001-188102 discloses an antireflection film including an antifouling layer of a perfluoropolyether radical-bearing silane coupling agent of the formula (6):

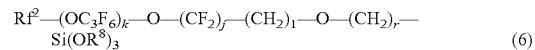

(6)

wherein $Rf^2$ is a straight-chain or branched perfluoroalkyl radical having 1 to 16 carbon atoms, k is an integer of 1 to 50, j is an integer of 0 to 3, i is an integer of 0 to 3, r is an integer of 0 to 6, $0<j+i\leq6$, and $R^8$ is $C_1$–$C_{10}$ alkyl. The perfluoropolyether radical-bearing silane coupling agent used in the antifouling layer does not contain polar radicals, but the proportion (wt %) of hydrolyzable radicals per molecule is not fully high. The problems of time-consuming curing and poor adhesion to substrates must be overcome before this silane coupling agent can be utilized as the surface treating agent.

There is a desire to have an antireflection filter which is less receptive to contaminants; which if contaminants deposit thereon, makes the contaminants to be less perceivable and makes it easy to wipe off the contaminants (including human contaminants such as hand dirt and fingerprints), is resistant to marring by the wiping operation; which if water droplets deposit thereon, is easy to shake off the droplets; and which keeps for a long term the desired functions including stain resistance, ease of wiping-off, mar resistance and water repellency.

SUMMARY OF THE INVENTION

Therefore, an object of the invention is to provide novel perfluoropolyether-modified silanes having improved properties including water and oil repellency, parting properties, chemical resistance, lubricity, durability, antifouling properties and fingerprint wipe-off; surface treating agents comprising the same; and antireflection filters including an antifouling layer having improved antifouling properties, fingerprint wipe-off and durability.

The present inventor has discovered that perfluoropolyether-modified silanes having the general formula (1) shown below have improved properties including water and oil repellency, parting properties, chemical resistance, lubricity, durability, antifouling properties and fingerprint wipe-off, can be used as surface treating agents, and are suited to form cured films on the surface of antireflection filters.

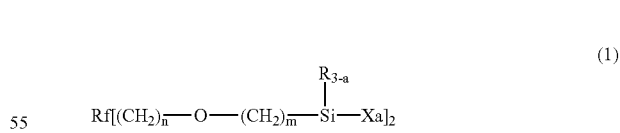

(1)

Herein Rf is a divalent straight-chain perfluoropolyether radical, R is a $C_1$–$C_4$ alkyl radical or phenyl radical, X is a hydrolyzable radical, n is an integer of 0 to 2, m is an integer of 1 to 5, and "a" is 2 or 3.

The invention also relates to an antireflection filter comprising an inorganic antireflection layer including a surface layer in the form of a silicon dioxide-base inorganic layer, and an antifouling layer on the surface layer. It has been found that when the antifouling layer is given a sliding angle of oleic acid of up to 5° as by forming the layer from the silane of formula (1), and a change of the sliding angle after solvent washing relative to the sliding angle before solvent washing is controlled to 10% or less, there is obtained the antireflection filter having the following advantages. The antifouling layer has low surface energy and minimized sticking force of contaminants, retains such effects for a long term, is resistant to deposition of contaminants such as fingerprints, skin grease, sweat and cosmetics. Even if contaminants deposit thereon, the antifouling layer makes it easy to wipe off the contaminants and experiences a minimal drop of its function by rubbing. The antireflection layer receives least mars on its surface. The separation of the antireflection layer promoted by mars is prevented.

Accordingly, a first aspect of the invention provides a perfluoropolyether-modified silane having the general formula (1) defined above.

In a second aspect, the invention provides a surface treating agent primarily comprising the perfluoropolyether-modified silane and/or a partial hydrolytic condensate thereof.

In a third aspect, the invention provides an antireflection filter comprising an inorganic antireflection layer including a surface layer in the form of a silicon dioxide-base inorganic layer, and an antifouling layer on the surface layer having a sliding angle of oleic acid of up to 5°, a change of the sliding angle after solvent washing relative to the sliding angle before solvent washing being up to 10%. Preferably, the antifouling layer is made of the perfluoropolyether-modified silane of formula (1) and/or a partial hydrolytic condensate thereof.

DESCRIPTION OF THE PREFERRED EMBODIMENTS

Figure 1:
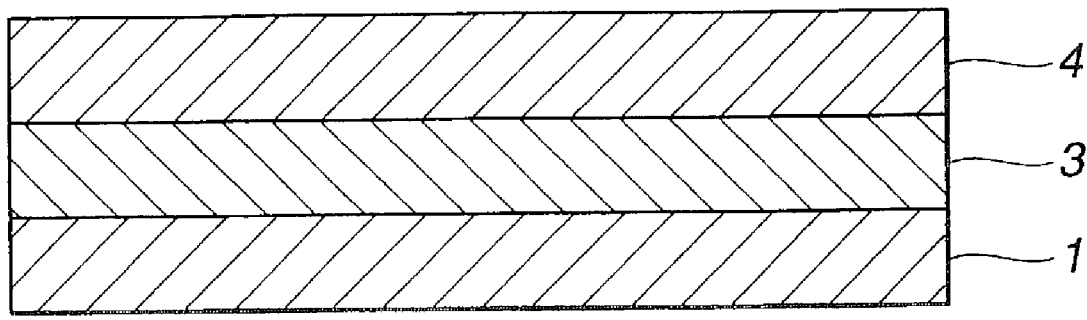
FIGS. 1 to 2 are cross-sectional views of antireflection filters according to preferred embodiments of the invention.

The perfluoropolyether-modified silanes of the invention have the following general formula (1).

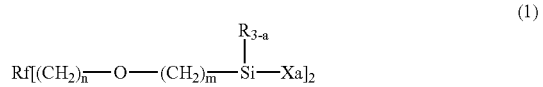

(1)

Herein Rf is a divalent straight-chain perfluoropolyether radical, R is a $C_1$–$C_4$ alkyl radical or phenyl radical, X is a hydrolyzable radical, n is an integer of 0 to 2, m is an integer of 1 to 5, and "a" is 2 or 3.

The divalent straight-chain perfluoropolyether radicals represented by Rf include perfluoropolyether radicals of differing chain length and are preferably divalent straight-chain perfluoropolyether radicals containing recurring units of perfluoropolyether having about 1 to about 4 carbon atoms. Examples of suitable divalent straight-chain perfluoropolyether radicals are shown below.

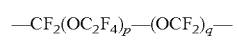

In the above chemical structural formulae, k, p and q each are an integer of at least 1, preferably in the range of 1 to 50, more preferably in the range of 10 to 40. The molecular structure of perfluoropolyether is not limited to the illustrated structures.

X is a hydrolyzable radical. Illustrative examples of suitable hydrolyzable radicals include alkoxy radicals such as methoxy, ethoxy, propoxy and butoxy, alkoxyalkoxy radicals such as methoxymethoxy and methoxyethoxy, acyloxy radicals such as acetoxy, alkenyloxy radicals such as isopropenoxy, and halogen radicals such as chloro, bromo and iodo. Of these, organooxy radicals such as alkoxy and alkenyloxy radicals and chloro are preferred, with methoxy, ethoxy, isopropenoxy and chloro being most preferred.

R is a lower alkyl radical of 1 to 4 carbon atoms or phenyl radical, for example, methyl, ethyl and phenyl, with methyl being most preferred.

In formula (1), n is an integer of 0 to 2, and preferably equal to 1; m is an integer of 1 to 5, and preferably equal to 3; and "a" is equal to 2 or 3, and preferably equal to 3 from the standpoints of reactivity and substrate adhesion.

The molecular weight of the perfluoropolyether-modified silane compounds according to the invention is not critical although number average molecular weights of about 500 to about 20,000, especially about 1,000 to about 10,000 are appropriate for stability and ease of handling.

Illustrative examples of the perfluoropolyether-modified silanes include those of the following structural formulae, but are not limited thereto.

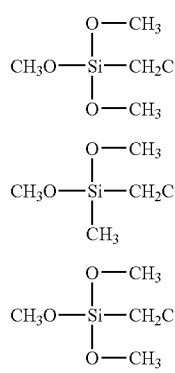
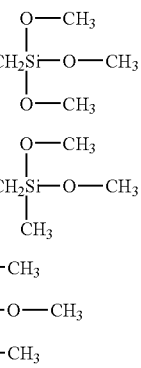

-continued

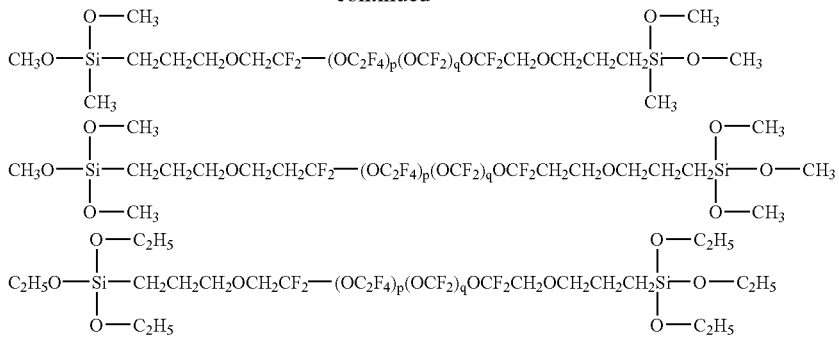

In the above formulae, L is an integer of 1 to 50, p is an integer of 1 to 50, q is an integer of 1 to 50, p+q is 10 to 100, and the arrangement of recurring units is random. These compounds may be used alone or in admixture of any.

The perfluoropolyether-modified silane compounds according to the invention are prepared, for example, by effecting addition reaction of a hydrosilane having a hydrolyzable radical to a perfluoropolyether having alpha-unsaturation at either end in the presence of a platinum group catalyst according to a conventional hydrosilylation procedure. The reaction scheme is shown below.

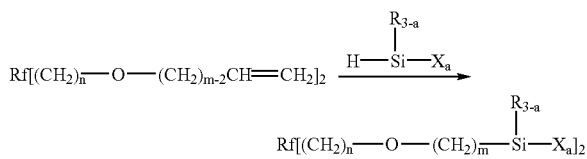

Herein, Rf, R, X, n, m and a are as defined above.

One reactant, perfluoropolyether having alpha-unsaturation at either end can be synthesized by reacting a both end alcohol-modified perfluoropolyether of formula (7) below with an alkali metal such as K, Na or Li or an alkali metal hydroxide such as KOH, NaOH or LiOH to produce a both end alcoholate-modified perfluoropolyether of formula (8) below and reacting it with an alpha-unsaturation-bearing halide.

(7)

(8)

Herein, n is as defined above, and M is an alkali metal.

Since the perfluoropolyether-modified silane of the invention does not contain in its molecule polar radicals which can be detrimental to the properties of the silane, it is improved in water and oil repellency, antifouling properties, chemical resistance, lubricity and parting properties. The silane can thus be utilized as a surface treating agent by coating it to surfaces of various substrates. Since at least two hydrolyzable radicals such as hydrolyzable silyl radicals are located at each end of its molecule, the silane at both ends is firmly bound to the substrate so that its effect lasts long.

In order to utilize the above function, the perfluoropolyether-modified silane can be used as:

water and oil repellents applicable to paper, fabric, metals, glass, plastics, ceramics, etc.;

parting agents applicable to pressure-sensitive adhesive tape, resin molding molds, rolls, etc.;

antifouling agents applicable to paper, fabric, metals, glass, plastics, ceramics, etc.; and other agents such as paint additives, resin modifiers, agents for modifying the flow and dispersion of inorganic fillers, and agents for improving the lubricity of tape and film.

The perfluoropolyether-modified silane of the invention can be advantageously used as a surface treating agent, for example, for forming a cured coating on the surface of an antireflection filter. The present invention thus provides a surface treating agent primarily comprising the perfluoropolyether-modified silane of formula (1) and/or a partial hydrolytic condensate thereof as a main component.

If necessary, an organooxysilane hydrolytic condensation catalyst may be added to the surface treating agent. Exemplary organooxysilane hydrolytic condensation catalysts include organic tin compounds (e.g. dibutyltin dimethoxide and dibutyltin dilaurate), organic titanium compounds (e.g., tetra-n-butyl titanate), organic acids (e.g., acetic acid and methanesulfonic acid), and mineral acids (e.g., hydrochloric acid and sulfuric acid). Of these, acetic acid, tetra-n-butyl titanate and dibutyltin dilaurate are desirable. The catalyst is added in a catalytic amount, usually 0.01 to 5 parts by weight, especially 0.1 to 1 part by weight, per 100 parts by weight of the perfluoropolyether-modified silane and its partial hydrolytic condensate combined.

In the surface treating agent of the invention, the perfluoropolyether-modified silane and/or partial hydrolytic condensate may be used as such or diluted with a suitable solvent. A mixture of two or more solvents is acceptable. Those solvents in which the perfluoropolyether-modified silane and/or partial hydrolytic condensate can be uniformly dissolved are desirable.

Exemplary solvents include fluorine-modified aliphatic hydrocarbon solvents (e.g., perfluoroheptane and perfluorooctane), fluorine-modified aromatic hydrocarbon solvents (e.g., m-xylene hexafluoride and benzotrifluoride), fluorine-modified ether solvents (e.g., methylperfluorobutyl ether and perfluoro(2-butyltetrahydrofuran)), fluorine-modified alkylamine solvents (e.g., perfluorotributylamine and perfluorotripentylamine), hydrocarbon solvents (e.g., petroleum benzine, mineral spirits, toluene and xylene), and ketone solvents (e.g., acetone, methyl ethyl ketone and methyl isobutyl ketone). Of these, the fluorine-modified solvents are desirable from the standpoints of solubility and wetting properties. In particular, m-xylene hexafluoride, perfluoro (2-butyltetrahydrofuran) and perfluorotributylamine are desirable.

In forming a coating, the surface treating agent may be applied by well-known techniques such as brush coating, dipping, spray coating and evaporation. The optimum treating temperature varies with a particular treating technique, although a temperature from room temperature to about 120° C. is desirable when the agent is applied by brush coating or dipping. The application or treatment is desirably carried out under humidified conditions because humidity promotes the reaction. It is understood that appropriate treating conditions are selected on every application because the treating conditions vary depending on a particular silane compound and additives used.

Various substrates can be treated with the surface treating agent. Suitable substrate materials include paper, fabric, metals, metal oxides, glass, plastics, porcelain, and ceramics.

Articles on which surface a cured coating of the surface treating agent is formed include optical members such as eyeglass lenses and anti-reflection filters (coatings for preventing fingerprint and grease contamination); sanitary ware such as bathtubs and washbowls (water repellent, antifouling coatings); glazing and head lamp covers in vehicles such as automobiles, trains and aircraft (antifouling coatings); building exteriors (water repellent, antifouling coatings); kitchen ware (coatings for preventing oil contamination); telephone booths (water repellent, antifouling, anti-sticking coatings); and artistic objects (water and oil repellent, anti-fingerprint coatings); and compact disks and DVDs (coating for preventing fingerprint). The surface treating agent of the invention is especially suited to form coatings on optical members such as lenses and filters to impart antireflection and antifouling properties thereto.

In the third aspect, the invention provides an antireflection filter, and especially an antireflection filter having on its surface a cured coating of the perfluoropolyether-modified silane of formula (1) and/or partial hydrolytic condensate thereof. The antireflection filter includes an inorganic antireflection layer having a surface layer in the form of a silicon dioxide-base inorganic layer, and an antifouling layer formed on the surface layer. The antifouling layer should have a sliding angle of oleic acid of up to 5°, and a change of the sliding angle after solvent washing relative to the sliding angle before solvent washing be up to 10%.

The antifouling layer should have a sliding angle of oleic acid of up to 5°, preferably up to 3°. A percent change of the sliding angle after solvent washing relative to the sliding angle before solvent washing should be no more than 10%, preferably no more than 5%. If the sliding angle of oleic acid is greater than 5°, the layer has poor antifouling properties so that it is readily marked with fingerprints, and becomes difficult to wipe off contaminants and less slippery on the surface during the wiping.

It is noted that the sliding angle of oleic acid can be measured using a conventional contact angle meter.

Solvent washing is carried out by immersing a sample in the solvent for 5 minutes, taking out the sample and allowing the solvent to lightly flow away. The solvent may be one used in conventional washing, for example, nonafluorobutyl methyl ether designated as HCFC-225.

If the percent change of the sliding angle B after solvent washing relative to the sliding angle A before solvent washing, that is, (B−A)/A×100%, is more than 10%, then antifouling and fingerprint wipe-off properties may not last long.

Also, the bonding force of the antifouling layer to pressure-sensitive adhesive tape should preferably be up to 0.2 N/19 mm both before and after solvent washing. If the bonding force of the antifouling layer to pressure-sensitive adhesive tape is more than 0.2 N/19 mm, then fingerprint wipe-off properties may be poor. The bonding force of the antifouling layer to pressure-sensitive adhesive tape is measured by attaching polyester pressure-sensitive adhesive tape to the surface of the antifouling layer and pulling the tape at an angle of 180° and a peeling rate of 300 mm/min by means of a tensile tester.

In the preferred embodiment, the antifouling layer is formed of a perfluoropolyether-modified silane, especially formed as a cured coating of the perfluoropolyether-modified silane of the general formula (1), which is reproduced below, or a partial hydrolytic condensate thereof.

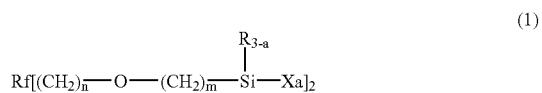

Herein Rf is a divalent straight-chain perfluoropolyether radical, R is a $C_1$–$C_4$ alkyl radical or phenyl radical, X is a hydrolyzable radical, n is an integer of 0 to 2, m is an integer of 1 to 5, and "a" is 2 or 3.

In forming the antifouling layer, well-known techniques such as brush coating, dipping, spray coating and evaporation may be used. The optimum treating temperature varies with a particular treating technique, although a temperature from room temperature to about 120° C. is desirable when the silane is applied by brush coating or dipping. The application or treatment is desirably carried out under humidified conditions because humidity promotes the reaction. It is understood that appropriate treating conditions are selected on every application because the treating conditions vary depending on a particular silane compound and additives used.

In such coating operation, the perfluoropolyether-modified silane may be used as such or diluted with a suitable solvent. A mixture of two or more solvents is acceptable. Those solvents in which the perfluoropolyether-modified silane can be uniformly dissolved are desirable. The solvents used herein are the same as enumerated previously.

If necessary, an organooxysilane hydrolytic condensation catalyst as enumerated previously may be added to the perfluoropolyether-modified silane.

The thickness of the antifouling layer is preferably in the range of 0.1 nm to 5 μm, and more preferably 1 to 100 nm although the thickness may be properly determined.

Figure 2:
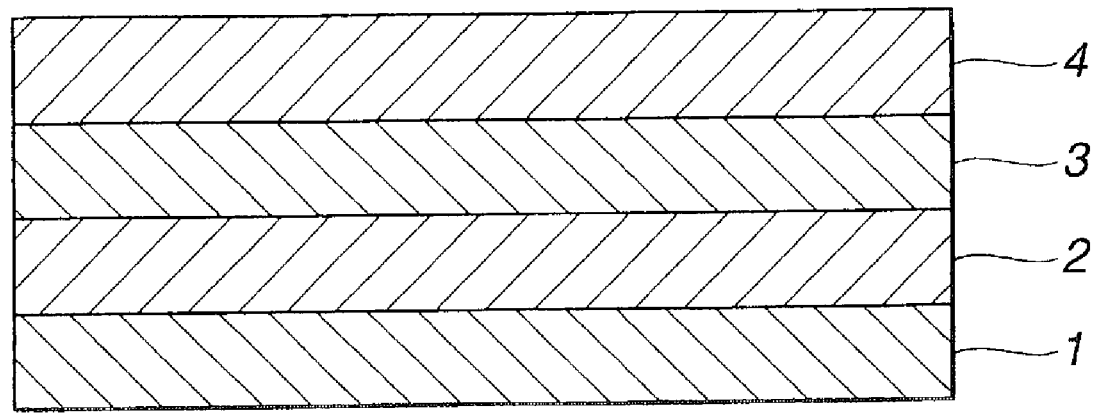

As mentioned above, the antireflection filter of the invention comprises an inorganic antireflection layer including a surface layer in the form of a silicon dioxide-base inorganic layer, and an antifouling layer formed on the surface layer. The inorganic antireflection layer is formed on a supporting substrate directly or through an intermediate layer such as a hard coat layer. Referring to FIGS. 1 and 2, there are illustrated typical constructions of the antireflection filter having an antifouling layer. The filter of FIG. 1 includes a supporting substrate 1, an inorganic antireflection layer 3 and an antifouling layer 4. The filter of FIG. 2 includes a supporting substrate 1, an intermediate layer 2, an inorganic antireflection layer 3 and an antifouling layer 4.

The inorganic antireflection layer is a portion that essentially contributes to an antireflection function. In the practice of the invention, it may have either a single layer structure or a plural layer structure as long as a silicon dioxide-base inorganic layer is included as a surface layer of the antireflection layer.

The inorganic antireflection layer may be formed as an antireflection layer of a structure known in the art, as described, for example, in JP-A 58-46301, JP-A 59-49501, JP-A 58-50401, JP-A 1-294709 and JP-B 6-5324.

It is preferred for antireflection effects that the antireflection layer have a plural layer structure. Preferred is a plural layer structure including a silicon dioxide-base inorganic layer as a surface layer and one or more layers having a higher index of refraction than the silicon dioxide-base inorganic layer. The thickness and index of refraction of the respective layers are determined according to the well-known technology.

In forming the inorganic antireflection layer, inorganic materials such as inorganic oxides, inorganic halides or composites thereof are useful. Typical inorganic materials include inorganic oxides such as $SiO_2$, $ZrO_2$, $Al_2O_3$, $Y_2O_3$ and $TiO_2$, and inorganic halides such as $MgF_2$, $BaF_2$, $CaF_2$, $LaF_2$, $LiF$, $NaF$ and $SrF_2$.

In forming the antireflection layer, one or more inorganic materials may be used in any suitable form such as solid form or dispersion form in a binder polymer or the like, depending on a particular forming technique to be described below. From the standpoints of hardness and stain resistance, it is recommended to use a composition containing at least 30% by weight of inorganic material(s). Any suitable polymer may be used as the binder although organosilicon compounds capable of forming polyorganosiloxanes and hydrolyzates thereof are preferred for hardness or the like.

Formation of the inorganic antireflection layer may be carried out by suitable thin-film forming techniques, for example, physical vapor deposition (PVD) techniques such as vacuum evaporation, sputtering and ion plating, and fluid applying techniques such as spin coating, dip coating, curtain flow coating, roll coating, spray coating and casting.

For the PVD techniques, inorganic oxides such as $SiO_2$ and inorganic halides such as $MgF_2$ as enumerated previously are often used. From the standpoint of surface hardness and adhesion to the antifouling layer, it is preferred that the silicon dioxide base inorganic layer serving as the surface layer be formed by the PVD technique as a layer primarily containing silicon dioxide.

In the inorganic antireflection layer, a conductive layer may be included that exerts the effect of removing static electricity for preventing dust and debris from depositing under the impetus of static build-up and the effect of shielding electromagnetic waves. Such a conductive layer is typically formed as a metal thin film of gold, silver, aluminum or the like or a transparent conductive film in the form of an inorganic oxide thin film of tin oxide, indium oxide, a mixture thereof (ITO), or the like. Most preferred are transparent conductive films based on inorganic oxides which show minimized absorption of light in the visible region.

The supporting substrate may be any desired one. Supporting substrates of glass and plastics are preferred when the antireflection film is formed by liquid coating techniques or the like. Although the inorganic antireflection film 2 is provided on one side of the supporting substrate 1 in the illustrated embodiments, the inorganic antireflection film 2 may be provided either on one side or on both sides of the supporting substrate 1.

For supporting substrates of glass, a low refractive index material such as $MgF_2$ or $CaF_2$ is preferably incorporated in the antireflection layer because better reflection effects are achievable. For plastic substrates, a material having a relatively low refractive index and a high hardness such as $SiO_2$ is preferably incorporated in the antireflection layer because durability is improved. Exemplary plastics include acrylic resins, diethylene glycol bisallyl carbonate resins, polycarbonate resins, polyester resins such as polyethylene terephthalate and unsaturated polyesters, acetate resins such as triacetyl cellulose, styrene resins, and polyvinyl chloride resins.

The supporting substrate may have any suitable shape such as a film, sheet or plate while its thickness is not critical. The supporting substrate may have a hard coat layer thereon as the intermediate layer. In this case, the antireflection filter is structured such that the hard coat layer 2 is disposed between the antireflection film 3 and the supporting substrate 1 as shown in FIG. 2.

Instead of or along with the hard coat layer, the supporting substrate may have a suitable coat layer or be surface treated for the purposes of enhancing the adhesion of the antireflection film, hardness, chemical resistance, durability, dyeability and the like as the intermediate layer.

For the purposes of enhancing hardness, suitable hardening materials may be used as described, for example, in JP-B 50-28092, JP-B 50-28446, JP-B 50-39449, JP-B 51-24368, JP-B 57-2735, and JP-A 52-112698. Additional effective means for hardness enhancement includes coating of an oxide of a metal such as titanium, aluminum or tin or an oxide of silicon and the provision of an acrylic crosslinked material such as (meth)acrylic acid crosslinked with pentaerythritol or the like.

The hard coat layer may be formed in a conventional manner. The preferred hard coat layers are formed of the cured products of organosilicon compounds, especially organosilicon compounds of the general formula (9) below, or hydrolyzates thereof.

$$R^9_f R^{10}_g Si(OR^{11})_{4-f-g} \qquad (9)$$

Herein $R^9$ and $R^{10}$ each are an alkyl, alkenyl or aryl radical, or a hydrocarbon radical having a halogen, epoxy, glycidoxy, amino, mercapto, methacryloxy or cyano radical; $R^{11}$ is a $C_1$–$C_8$ alkyl, alkoxyalkyl, acyl or aryl radical; each of f and g is 0 or 1, and f+g is 0, 1 or 2.

The hard coat layer may be provided as a layer having an anti-glare function by suitable techniques, for example, a technique of including small particles of silica or metal oxide having an average particle size of 0.5 to 5 µm using the sol-gel process or the like; or a technique of roughening the surface to a centerline average roughness of 0.01 to 0.5 µm by buffing, corona discharge treatment or ion etching.

EXAMPLE

Synthesis Example, Examples and Comparative Examples are given below for further illustrating the invention. The invention is not limited to the Examples. All parts are by weight.

Synthesis Example

A perfluoropolyether-modified silane, designated Compound 1, was synthesized as follows.

To a mixture of 160 g of a perfluoropolyether having alpha-unsaturation at either end represented by the formula (10) below, 80 g of m-xylene hexafluoride, and 0.1 g of a catalyst of chloroplatinic acid modified with $CH_2$=CH—$SiMe_2OSiMe_2$-CH=$CH_2$, 15 g of trimethoxysilane was added dropwise in a dry air atmosphere at 70° C. The contents were stirred for 8 hours for reaction. The solvent was distilled off, yielding 165 g of a colorless clear liquid (viscosity 45.5 cSt, specific gravity 1.730, refractive index 1.305) represented by the formula (11) below.

$$CH_2=CHCH_2OCH_2CF_2(OC_2F_4)_p(OCF_2)_q \\ OCF_2CH_2OCH_2CH=CH_2 \quad (10)$$

$$(CH_3O)_3SiCH_2CH_2CH_2OCH_2CF_2(OC_2F_4)_p(OCF_2)_q \\ OCF_2CH_2OCH_2CH_2CH_2Si(OCH_3)_3 \quad (11)$$

$p/q \approx 0.9$, $p+q \approx 45$

Example 1

An ethanol solution primarily containing 135 parts by weight of silica sol, 129 parts by weight of γ-glycidoxypropyltriethoxysilane in hydrolyzate form and 70 parts by weight of γ-chloropropyltrimethoxysilane in hydrolyzate form was applied to a PET film (100 μm thick) and cured to form a hard coat layer of 3 μm thick. On the hard coat layer, $SiO_2$ and $TiO_2$ layers were alternately deposited each to a λ/4 optical film thickness by a sputtering method whereby an antireflection layer consisting of five $SiO_2/TiO_2/SiO_2/TiO_2/SiO_2$ layers was formed. Next, a coating solution was prepared by dissolving 0.2 g of the perfluoropolyether-modified silane (Compound 1, prepared in Synthesis Example) in 99.8 g of perfluoro(2-butyltetrahydrofuran). The coating solution was applied onto the antireflection layer by a spin coating technique. The coating was allowed to stand for 24 hours in an atmosphere of 25° C. and humidity 70%, whereby the coating cured into an antifouling layer. The sample thus obtained was examined by tests (1) to (3) to be described below. The results are shown in Table 1.

(1) Surface Properties
  (1-a) Sliding Angle
  Using a contact angle meter Model CA-A by Kyowa Interface Science Co., Ltd., the sliding angle of a 2-mm diameter droplet of oleic acid on the antifouling layer was measured. Measurement was made at five different points on the surface, and an average was reported.
  (1-b) Bonding Force
  A polyester pressure-sensitive adhesive tape (No. 31B by Nitto Denko Co., Ltd., 19 mm wide) was attached to the surface of the antifouling layer. By using a tensile tester and pulling the tape at an angle of 180° and a peeling rate of 300 mm/min, the force required to peel the adhesive tape was measured.

(2) Durability
  The sample (antifouling layer-bearing film) was immersed for 5 minutes in a fluorochemical solvent (AK-225 by Asahi Glass Co., Ltd.), taken out, and dried. The sliding angle and bonding force were measured by the same tests (1-a) and (1-b) for evaluating durability or wash fastness.

(3) Antifouling
  The forefinger was pressed against the surface of the antifouling layer for 5 seconds whereby a fingerprint was marked. The fingerprint was wiped with dry fabric for evaluating the ease of fingerprint wipe-off. Evaluation was made according to the following criterion and reported as an average of five panel members.
  Fingerprint Wiping-Off
  ○: light wiping
  Δ: difficult to wipe off, but no track
  X: difficult to wipe off, with track left

Comparative Examples 1–3

Samples were prepared as in Example, aside from using Compounds 2 to 4 shown below, instead of Compound 1 (perfluoropolyether-modified silane). They were examined by the same tests, with the results shown in Table 1.

Compound 1

$$(CH_3O)_3SiCH_2CH_2CH_2OCH_2CF_2(OC_2F_4)_p(OCF_2)_q \\ OCF_2CH_2OCH_2CH_2CH_2Si(OCH_3)_3$$

$p/q \approx 0.9$, $p+q \approx 45$

Compound 2

$$CF_3O(CF_2CF_2O)_{30}CF_2CH_2OCH_2CH_2CH_2Si(OCH_3)_3$$

Compound 3

$$F(CFCF_2O)_{24}CFCONH(CH_2)_3Si(OCH_3)_3 \\ \phantom{F(}| \phantom{CF_2O)_{24}} | \\ \phantom{F(}CF_3 \phantom{CF_2O)_{24}} CF_3$$

Compound 4

$$(CH_3O)_3Si(CH_2)_3NHCOCF_2(OC_2F_4)_p(OCF_2)_q \\ OCF_2CONH(CH_2)_3Si(OCH_3)_3$$

$p/q \approx 0.6$, $p+q \approx 60$

TABLE 1

| Example | Compound | Sliding angle (deg) | | Parting property (N/19 mm) | | Fingerprint wipe-off |
| | | Before washing | After washing | Before washing | After washing | |
| --- | --- | --- | --- | --- | --- | --- |
| Example 1 | 1 | 1.8 | 1.8 | 0.12 | 0.14 | ○ |
| Comparative Example 1 | 2 | 2.5 | 11.3 | 0.10 | 0.37 | ○ |
| Example 2 | 3 | 3.4 | 10.4 | 0.19 | 0.37 | Δ |
| 3 | 4 | 6.2 | 6.5 | 0.29 | 0.34 | Δ |

It is evident that Example is superior in water/oil repellency and parting properties, their wash fastness, and fingerprint wipe-off to Comparative Examples.

The perfluoropolyether-modified silane of the invention, which does not contain in its molecule polar radicals that can be detrimental to the properties of the silane, is improved in water/oil repellency, parting properties, chemical resistance, lubricity, durability, antifouling properties and fingerprint wipe-off. The silane can be utilized as a surface treating agent to be coated to surfaces of various substrates, and is applicable to an antireflection filter by forming a cured coating thereof on a surface. The antireflection filter is resistant to staining, easy to wipe off such stains, has good surface lubricity and resistance to marring, and maintains such properties over a long term. The antireflection filter finds use as various optical elements such as viewers on LCD or the like and polarizers.

Japanese Patent Application Nos. 2001-310247 and 2001-378382 are incorporated herein by reference.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. A perfluoropolyether-modified silane having the following general formula (1):

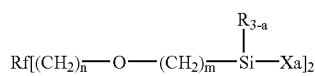
(1)

wherein Rf is a divalent straight-chain perfluoropolyether radical, R is a $C_1$–$C_4$ alkyl radical or phenyl radical, X is a hydrolyzable radical, n is an integer of 0 to 2, m is an integer of 1 to 5, and "a" is 2 or 3.

2. The perfluoropolyether-modified silane of claim 1 wherein the hydrolyzable radical X is an organooxy radical.

3. A surface treating agent comprising the perfluoropolyether-modified silane of claim 1 and/or a partial hydrolytic condensate thereof.

4. An antireflection filter comprising:

an inorganic antireflection layer including a surface layer in the form of a silicon dioxide-base inorganic layer, and an antifouling layer on the surface layer having a sliding angle of oleic acid of up to 5°, a change of the sliding angle after solvent washing relative to the sliding angle before solvent washing being up to 10%, wherein the antifouling layer comprises a perfluoropolyether-modified silane, and wherein the perfluoropolyether-modified silane has the following general formula (1):

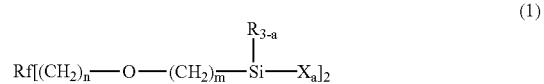
(1)

wherein Rf is a divalent straight-chain perfluoropolyether radical, R is a $C_1$–$C_4$ alkyl radical or phenyl radical, X is a hydrolyzable radical, n is an integer of 0 to 2, m is an integer of 1 to 5, and "a" is 2 or 3.

* * * * *